United States Patent [19]

Ekman

[11] 4,226,146
[45] Oct. 7, 1980

[54] PORTABLE LATHE DEVICE

[76] Inventor: Uno Ekman, Restadvägen 12, Vänersborg, Sweden

[21] Appl. No.: 933,588

[22] Filed: Aug. 14, 1978

[51] Int. Cl.³ .............................................. B23B 5/04
[52] U.S. Cl. ................................................... 82/4 A
[58] Field of Search ......................................... 82/4 A

[56] References Cited

U.S. PATENT DOCUMENTS 3,442,164   5/1969   Blazek .................................. 82/4 A

FOREIGN PATENT DOCUMENTS 2540187   3/1977   Fed. Rep. of Germany ............ 82/4 A
472238   6/1952   Italy ......................................... 82/4 A

*Primary Examiner*—Leonidas Vlachos
*Attorney, Agent, or Firm*—Holman & Stern

[57] ABSTRACT

The invention refers to a portable lathe device intended primarily for re-turning of worn-out brake discs of vehicles. The lathe device comprises a portable driving device, which via a clutch rotates the brake disc, when this is still mounted on the wheel shaft and the vehicle wheel being dismounted from the brake disc. A tool holder which can be attached to the mounting points for the dismounted brake yoke in the vehicle and which is provided with two individually adjustable lathe tools one for each side of the brake disc, is arranged adjacent to the driving device. The tool holder is movable radially to the brake disc. The driving device is prevented from rotating by motion preventing elements.

1 Claim, 2 Drawing Figures

PORTABLE LATHE DEVICE

BACKGROUND OF THE INVENTION

The present invention refers to a portable lathe device intended primarily for re-turning worn out brake discs for braked vehicle wheel shafts. When reconditioning brakes it has hitherto usually been necessary besides exchanging the brake blocks, to dismount the brake disc when the wear thereon has called therefore, and to send it to a work shop having the facilities necessary for effecting a re-turning thereof. This has meant that the vehicle has been subjected to stillstand during some time, as there has not for certain been any machine time available at the work shop in question when the brake disc has been delivered for re-turning.

For similar purposes small portable lathe devices have earlier been developed, which devices have been adapted particularly for turning of brake discs, but those older constructions has been designed in such a way that it has been necessary to dismount the brake disc although it has not been necessary to send it to a work shop for the machining.

The portable lathes device according to the invention eliminates this problem as the lathe device makes it possible to effect the re-turning of the brake discs, while these are still mounted on the vehicle and thus they need not be dismounted from the shaft, which means an apparent simplification of the work operation. The lathe device is at the same time of such an uncomplicated type and of so cheap construction that it can be used and owned by small car workshops, filling stations and the like.

SUMMARY OF THE INVENTION

These features have been achieved with a portable lathe device which incorporates a portable driving device, which is adapted to rotate the brake disc via a clutch device when the brake disc is still mounted on the wheel shaft and from which brake disc the vehicle wheel has been dismounted, the lathe device furthermore incorporating a tool holder arranged adjacent the driving device and provided with feed means and the lathe device is characterized thereby that the tool holder is equipped with means for its attachment to the mounting points for the dismounted brake yoke in the vehicle and with two individually adjustable lathe tools intended one for each side of the brake disc and adapted to be moveable radially relative to the brake disc.

The invention will hereinafter be further described with reference to two embodiments of the lathe device according to the invention shown in the accompanying drawings.

DESCRIPTION OF SOME PREFERRED EMBODIMENTS

Figure 1:
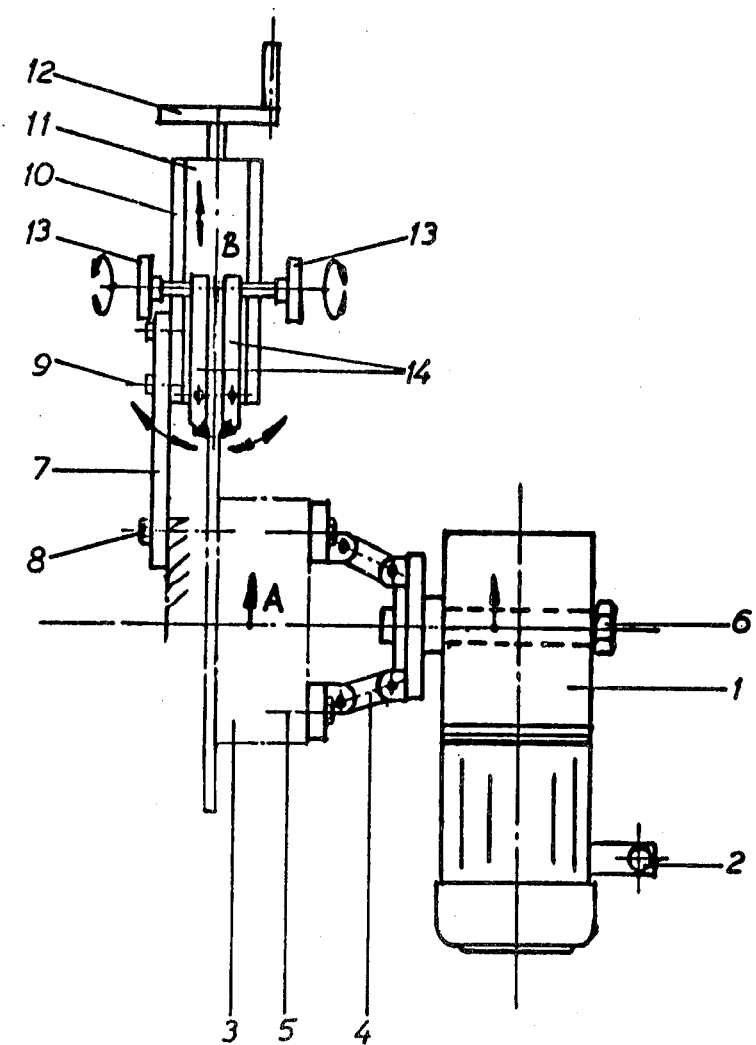
FIG. 1 shows a diagrammatic view from above of one embodiment of a lathe device according to the invention.

The lathe device according to the invention shown in FIG. 1 incorporates a driving device 1, which for instance can be an electric motor provided with a worm transmission. The motor is prevented from rotating by means of a supporting post 2 and it is adapted via a clutch to drive the brake disc 3, which is still mounted on the wheel shaft, in the direction shown by arrow A. The clutch device 4 is connected to the brake disc by means of a screw joint 5 fitted in the brake disc bores or guide spindles intended for attachment of the wheel hub with its tire to the brake disc.

The brake yoke with the brake shoes and the brake pistons have been dismounted from the wheel and an attachment arm 7 has thereupon by means of bolts 8 been fixed in the bores intended for fitting of the brake yoke. The attachment arm 7 is via bolts 9 attached to a tool holder incorporating a bottom plate 10 provided with guides along which a carrying plate 11, which carries lathe tools 14 is displaceable in the direction of arrow B. The carrying plate motion is effected manually via a hand wheel 12 and a transmission. The lathe tools 14, one for each side of the brake disc, are both individually laterally adjustable by means of one adjustment screw 13 each. The bottom plate 10 can be mounted in right hand or left hand positions relative to the attachment arm 7 to be able to be used for reconditioning of brake discs situated at any side of the vehicle.

Figure 2:
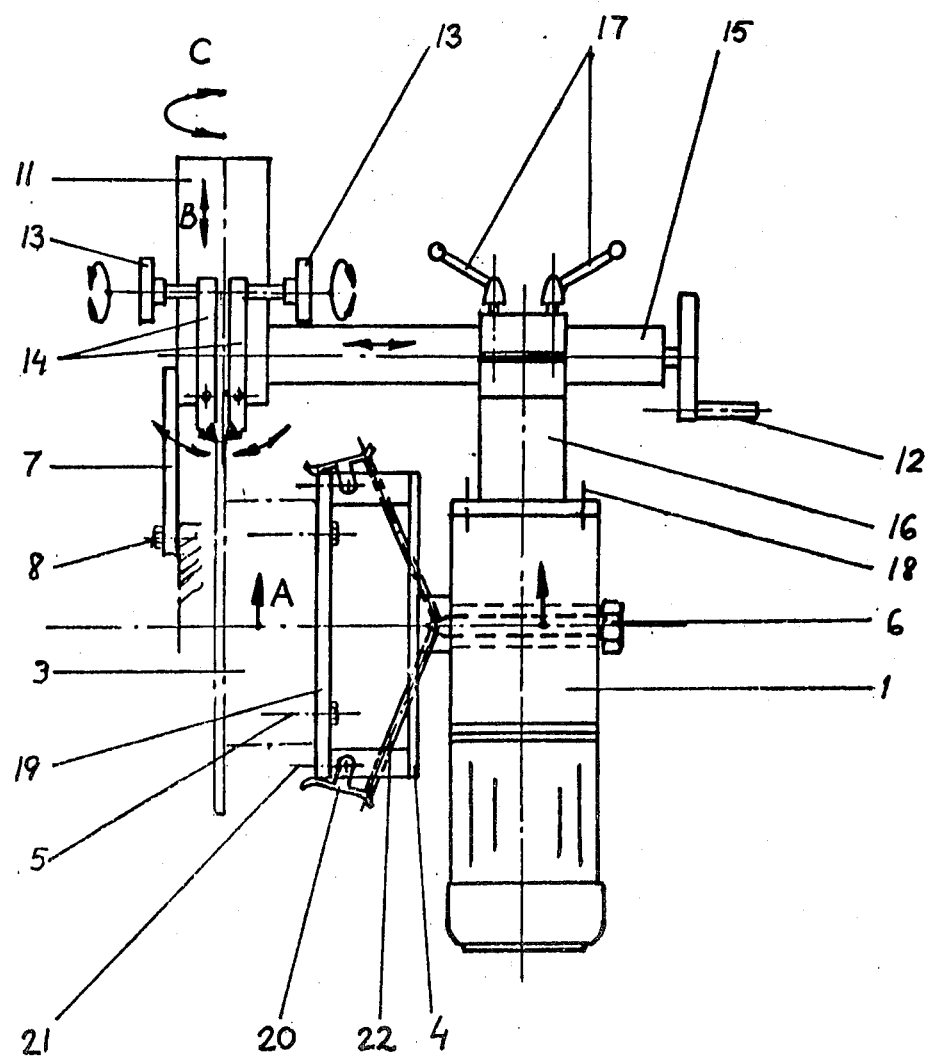
FIG. 2 is a corresponding view of a second embodiment of the lathe device according to the invention.

In FIG. 2 is shown a modified embodiment of the portable lathe device according to the invention, whereby members identical with those shown in FIG. 1 has been given the same reference numerals as in the earlier embodiment.

In FIG. 2 is thus shown a driving device 1, which is prevented from rotating. The brake disc 3 is driven in the direction A by the driving device 1, which e.g. can be a worm transmission motor or the like through the intermediary of a clutch device 4 designed as a mounting plate fixed to the fitting bores or the guide spindles of the brake disc intended in normal operation to receive a wheel hub with tire by means of a screw joint 5. One end of an attachment arm 7 is by means of bolts 8 attached to the bores for the brake yoke, whereas the opposite end of the attachment arm is fixed to one end of a supporting arm 15, which at its end situated nearest to the attachment arm 7 supports the carrying plate 11. The carrying plate is at its lower side provided with sliding guides, and it is axially moveable in the direction shown with arrows B on the guide system. The carrying plate carries lathe tools 14, which are individually laterally adjustable by means of adjustment screws 13. The carrying plate 11 can be turned through 180° in the direction shown with arrow C and it can be locked in two positions whereby the plate in a simple manner can be adjusted to fit any brake disc regardless what side of the vehicle it is located. The supporting arm 15 is at its side turned away from the carrying plate 11 connected to the driving motor 1 via a bracket 16, which by means of locking arms 17 can be locked to the supporting arm 15 and the opposite side of which is connected at 18 to the driving device 1. A transmission and guides are supported in the supporting arm 15, and by means of the hand wheel 12 arranged at the end of the supporting arm 15 remote from the carrying plate is it possible to displace the carrying plate via the gear built into the supporting arm in the direction of the arrows B. The clutch device 4 in this embodiment incorporates a mounting plate 19, which is fitted to the brake disc by means of screws or nuts 5 in the holes for the rim bolts. The clutch device furthermore incorporates a number of guiding pins and clamping shoulders 20, which are fitted to the mounting plate 19 by means of suitable members at 21 and these clamping shoulders 30 are adapted to lock the mounting plate when locking bars 22 are acted upon when the center screw 6 is tightened. A centering of the driving motor shaft and the brake disc is hereby obtained. The main task for the centre screw 6 is in accordance with the embodiment according to FIG. 1 to retain the gear device in the driving device 1 but in this embodiment it has also this further task as a clamping device.

Both embodiments of the portable lathe device shown in FIGS. 1 and 2 work mainly in the same manner and give the same advantages. After the vehicle, on which the brake discs shall be re-turned, has been blocked up and wheel and brake yoke with brake shoes and brake pistons have been dismounted the attachment arm 7 is fitted to the bores for the brake yoke. The clutch device 4 is centered and fixed to the brake disc by means of the fitting member 5 and the carrying plate 11 of the tool holder is adjusted to its correct position in relation to the brake disc, whereupon the lathe tools 14 are individually adjusted by means of the hand wheels 13 to accurate turning positions. The driving motor 1 is thereupon started and it rotates the brake disc via the built in gear. The lathe tools 14 are immobile except for their adjustment possibilities, sideways and in the feed direction shown by arrows B. The feed of the lathe tools in the radial direction of the brake disc is effected by means of manual maneuvring on the hand wheel 12, but it is also possible to connect this hand wheel to an air driven, slowly rotating drilling machine or the like for obtaining a more even lathe tools feed. In the embodiment according to FIG. 2 the attachment arm 7 is furthermore intended to ascertain that the driving motor does not start to rotate and it thereby takes over the function of the supporting post 2 at embodiment according to FIG. 1.

The invention is not limited to the embodiments shown in the accompanying drawings but variations and modifications are possible within the scope of the appended claims.

What I claim is:

1. A portable lathe device, intended primarily for returning of brake discs and comprising a portable driving device including a drive member and a clutch device connected with said drive member, said clutch device incorporating a centering device adapted to ascertain that the driving device and the brake disc shafts are aligned, said centering device comprising a rotatable disc for mounting to the brake disc, guiding means for aligning the rotatable disc with the brake disc and clamping means for locking the rotatable disc and the brake disc in aligned position, means for attaching said clutch device to a brake disc for rotation of the disc when still mounted on a wheel shaft and from which brake disc the vehicle wheel has been dismounted, a tool holder adjacent the driving device and provided with feed means, means for attaching said tool holder to the mounting points for a dismounted brake yoke, said tool holder including two individually adjustable lathe tools intended one for each side of the brake disc and said tool holder being moveable radially relative to the brake disc and a supporting arm rigidly connecting said last holder with said driving device to form an integral portable unit.

* * * * *